Nov. 24, 1959    W. S. McLENNAN, SR    2,914,098
TOOL HOLDER
Filed April 1, 1958
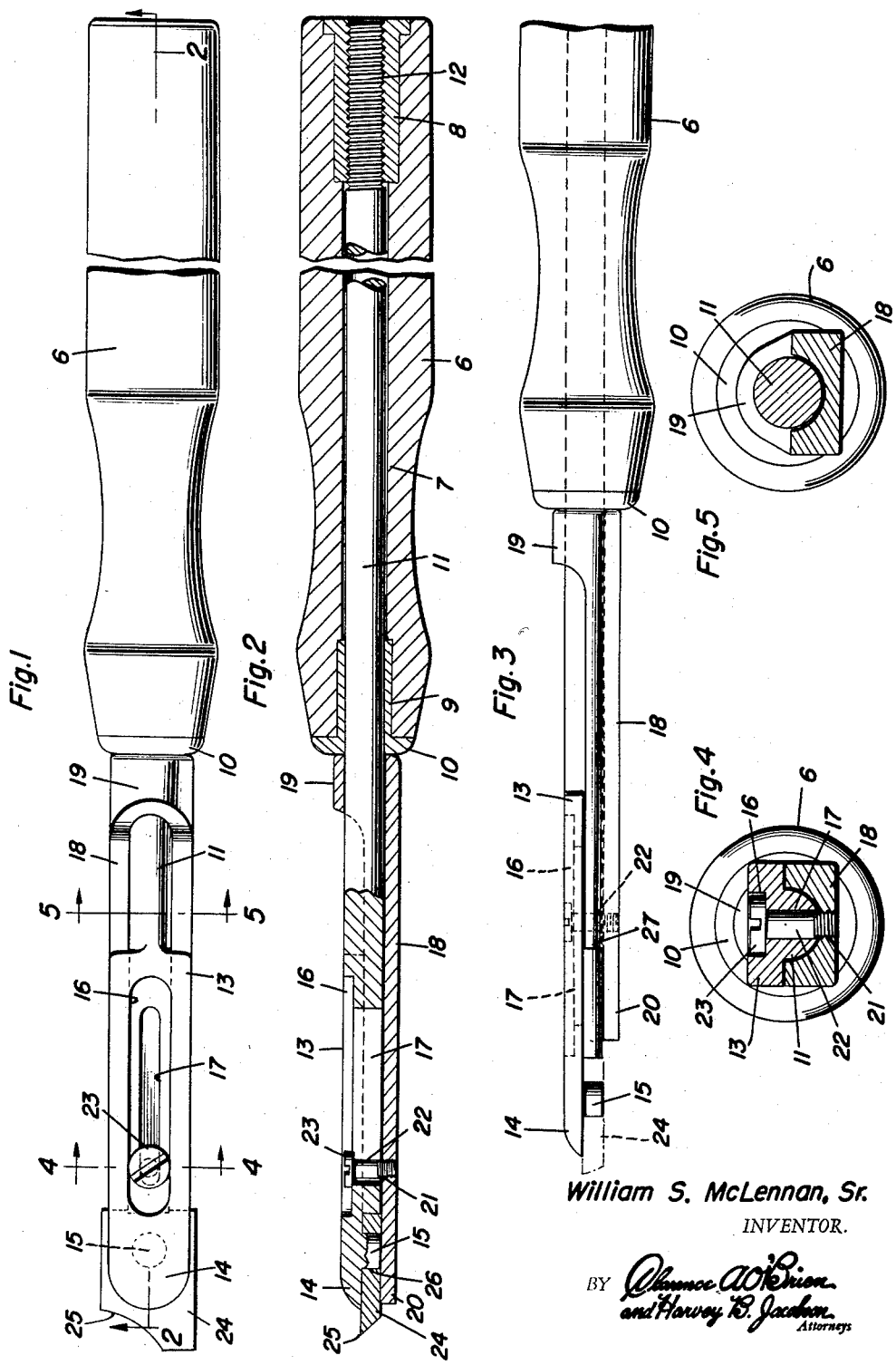
William S. McLennan, Sr.
INVENTOR.

United States Patent Office 2,914,098
Patented Nov. 24, 1959

2,914,098
TOOL HOLDER
William S. McLennan, Sr., Wharton, N.J.
Application April 1, 1958, Serial No. 725,744
3 Claims. (Cl. 142—56)

The present invention relates to new and useful improvements in tool holders and has for its primary object to provide, in a manner as hereinafter set forth, a device of this character which is particularly adapted to hold any of the usual cutter blades of various shapes of the type used on the molding cutter heads of circular saws, thus permitting the curves performed on a wood turning lathe to be produced by hand in addition to greatly increasing the usefulness of such blades.

Another important object of the invention is to provide a device of the character described comprising novel means for firmly clamping the molding cutter blades in position.

Other objects of the invention are to provide a tool holder of the aforementioned character which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a top plan view of a tool holder constructed in accordance with the present invention;

Figure 2 is a view in longitudinal section through the device, taken substantially on the line 2—2 of Figure 1;

Figure 3 is a side elevational view;

Figure 4 is a view in transverse section, taken substantially on the line 4—4 of Figure 1; and Figure 5 is a view in transverse section, taken substantially on the line 5—5 of Figure 1.

Referring now to the drawing in detail, it will be seen that the embodiment of the invention which has been illustrated comprises an elongated handle 6 of suitable material, preferably wood. The handle 6, which may also be of any desired dimensions, has extending longitudinally therethrough a central bore 7. Fixed in the rear end portion of the bore 7 is an internally threaded metallic sleeve or nut 8. Fixed in the bore 7 in the forward end portion of the handle 6 is a bushing or bearing 9 comprising, on its forward end, a head or flange 10 which abuts said handle.

Extending slidably into the handle 6 through the bearing 7 is a metallic rod 11 comprising a threaded rear end portion 12 which is screwed into the sleeve or nut 8. The rod 11 projects forwardly from the handle 6 and has formed integrally with its upper forward portion a horizontal plate 13. The plate 13 projects longitudinally beyond the rod 11 and terminates in a rounded forward end portion 14 constituting a blade backing and retaining jaw. Formed integrally with the jaw 14 is a depending blade keying pin or lug 15. The plate 13 further includes a longitudinal channel or recess 16 which communicates with a longitudinal slot 17 formed in and extending through the semi-circular portion of the rod 11 (Figs. 2 and 4.)

Slidably mounted beneath the forwardly projecting end portion of the rod 11 is a grooved bar 18 of suitable metal. The bar 18 includes a tubular or sleeve-like rear end portion 19 which is slidable on the rod 11 and which is adapted to abut the flange 10 of the bearing 9. The bar 18 further includes, on its forward end, a longitudinally projecting plate or jaw 20 the purpose of which will be presently set forth. Adjacent the jaw 20, the bar 18 is provided with a threaded opening 21 for the reception of a screw 22. The screw 22 is operable in the slot 17 and includes a head 23 which is engaged in the channel 16.

It is thought that the use of the device will be readily apparent from a consideration of the foregoing. Reference character 24 designates a conventional molding cutter blade comprising the usual beveled cutting edge 25 and an opening 26. To mount the blade 24 in the holder, the rod 11 is held against turning and the handle 6 is turned counterclockwise, thus adjusting said rod 11 forwardly through the medium of the sleeve or nut 8. In this manner the pin or lug 15 is adjusted forwardly beyond the jaw 20. The blade 24 is then engaged beneath the jaw 14 of the plate 13 with the lug or pin 15 keyed in the opening 26. The handle 6 is then reversed for retracting the rod 11 thus positioning and clamping the blade 24 between the complemental jaws 14 and 20. The blade 24 is also brought into abutting engagement with the forward end of the grooved bar 18, as at 27 (see Figure 3). The screw 22 is then tightened as desired for firmly clamping the blade 24 between the jaws 14 and 20, the jaw 14 thus constituting an upper jaw in the official drawing. The user may now proceed with the wood turning operation. As the rod 11 is adjusted forwardly or rearwardly relatively to the bar 18 the screw 22 travels back and forth in the slot 17. The screw 22 also retains the bar 18 against rotation on the rod 11.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A tool holder of the character described comprising: an elongated tubular handle, a rod slidably mounted in the handle and projecting from one end thereof, means threadedly connecting the rod to the handle for longitudinal actuation thereby, a longitudinally grooved bar slidably mounted beneath the rod and including a tubular end portion encircling said rod and engageable with said one end of said handle, a jaw on the other end of the bar, a jaw on one end of the rod cooperable with the first named jaw for receiving a cutter blade therebetween, an anchoring lug on the second named jaw engageable in the blade, said rod having a longitudinal slot therein, and a screw operable in the slot and connecting the rod and the bar for closing the jaws on the blade.

2. A cutting blade holder comprising an elongated handle having an axial bore extending therethrough and opening through the forward and rearward ends of the handle, a sleeve nut secured in said handle at the rearward end of the handle, the threaded bore of said nut being in alignment with the adjacent end portion of said axial bore, a ferrule fitted into the forward end portion of said bore and providing a bearing, a rod of a length greater than the over-all length of the handle, an approximate half-portion of said rod being mounted slidingly and rotatably in said axial bore, the rearward end of the rod having a screw threaded shank adjustably screwed into said sleeve nut, the median portion of the rod being mounted for free rotation in said bearing, a portion of said rod projecting beyond the forward portion of the handle and being formed into a plate, said plate having a lengthwise slot, an end portion of the plate beyond the forward end of said slot being formed into a first jaw, said jaw being provided with a lateral keying lug, a longitudinally grooved bar having a sleeve-like portion at the inner end thereof, said sleeve-like portion embracing the median portion of the rod and abutting the forward end of the handle, a portion of said rod being seated in the groove and the outer end of said bar being formed with a portion defining a second jaw opposed to and cooperating with the first jaw, said jaws being adapted to permit a cutting blade to be sandwiched and clamped therebetween, and a setscrew carried by the bar and extending through and cooperatively keyed in said slot.

3. A tool holder comprising an elongated handle having a cylindrical bore extending lengthwise through the handle, a rigid rod cylindrical in cross-section and of a length appreciably greater than the length of the handle and having an approximate half-portion thereof slidable longitudinally and rotatable in said bore and having one end provided with screw threads and screwed into an adjusting nut which is fixed at one end of the bore in the handle for purposes of extending and retracting the rod relative to the handle, a blade clamping jaw fixedly mounted on the outer end of said rod, a grooved bar having an inner end abutting the outer end of the handle and embracing said rod and having a portion juxtaposed to and extending in general parallelism with the rod and terminating at its outer end in a second jaw, said jaws having opposed flat parallel surfaces adapted to assemble and clamp a cutting blade therebetween, said rod having a lengthwise slot, a setscrew carried by the bar and extending through the slot, the head of said setscrew being clampable against a retaining surface on said rod to bind and clamp the bar and rod together in a manner to maintain the same in relatively fixed cooperating relationship, the flat surface of said first jaw having a lug lateral to said jaw surfaces and adapted to be keyed in a hole provided therefor in a cutting blade, one end of said lug having sliding cooperative contact with the cooperating surface of the second named jaw.

References Cited in the file of this patent

UNITED STATES PATENTS

| | | |
|---|---|---|
| 115,070 | Laurence | May 23, 1871 |
| 303,138 | Ensminger | Aug. 5, 1884 |
| 812,567 | Ivory | Feb. 13, 1906 |
| 2,139,147 | Blum | Dec. 6, 1938 |
| 2,431,118 | Heigle | Nov. 18, 1947 |